US012646971B1

(12) United States Patent
    Park et al.

(10) Patent No.:    US 12,646,971 B1
(45) Date of Patent:      Jun. 2, 2026

(54) WIRELESS CHARGER FOR WEARABLE DEVICE

(71) Applicant: AMAZON TECHNOLOGIES, INC., Seattle, WA (US)

(72) Inventors: Subum Park, Dublin, CA (US); Hailong Piao, Newark, CA (US); Pierre Djinki, San Francisco, CA (US); Giridhar Jayaraman, San Francisco, CA (US); David Peace Pritzkau, Cupertino, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 931 days.

(21) Appl. No.: 17/809,825

(22) Filed: Jun. 29, 2022

(51) Int. Cl.
    *H02J 50/10*      (2016.01)
    *H02J 7/90*      (2026.01)
    *H02J 50/00*      (2016.01)
    *H02J 50/90*      (2016.01)
    *G02B 27/01*      (2006.01)

(52) U.S. Cl.
    CPC .............. *H02J 50/10* (2016.02); *H02J 7/975* (2026.01); *H02J 50/005* (2020.01); *H02J 50/90* (2016.02); *G02B 27/0176* (2013.01)

(58) Field of Classification Search
    CPC ..................................................... H02J 50/10

USPC .......................................................... 320/107
See application file for complete search history.

(56) References Cited

U.S. PATENT DOCUMENTS

2017/0011210 A1\*   1/2017   Cheong .................. A61B 5/681
2019/0123585 A1\*   4/2019   Yang ........................ H02J 50/90
2019/0196228 A1\*   6/2019   Moore ............... G02B 27/0176

FOREIGN PATENT DOCUMENTS

CN          214041887    *   8/2021

\* cited by examiner

*Primary Examiner* — Yalkew Fantu
(74) *Attorney, Agent, or Firm* — Lindauer Law, PLLC

(57) ABSTRACT

A wireless charging device for charging a head-mounted wearable device (HMWD) includes a base, a sidewall that extends from the base, and a bridge support that extends from the base and is spaced apart from the sidewall. At least one charging antenna is positioned within the sidewall. The HMWD is engaged with the charging device by placing the nose bridge of the HMWD in contact with the top of the bridge support, while the temples of the HMWD extend into the space between the sidewall and bridge support. The sidewall, bridge support, and base constrain movement of the temples relative to the charging device in a manner that retains the receiving antennae in the temples within a range of positions relative to the charging antenna that are suitable to receive electrical power.

20 Claims, 11 Drawing Sheets

CHARGING DEVICE 102

POWER SUPPLY 802

PROCESSOR(S)
804

CLOCK
806

COMMUNICATION
INTERFACE(S)
808

I/O INTERFACE(S)
810

NETWORK INTERFACE(S)
812

I/O DEVICE(S)
814

SENSORS
816

OUTPUT DEVICE(S)
818

MEMORY 820

OPERATING SYSTEM MODULE
822

PROCESSING MODULE
826

COMMUNICATION MODULE
836

⋮

OTHER MODULE(S)
838

DATA STORE 824

SENSOR DATA 828

THRESHOLD DATA 830

OUTPUT DATA 834

⋮

OTHER DATA 840

900

SENSOR(S)
816

TEMPERATURE SENSOR 606

AMBIENT LIGHT SENSOR 912

PROXIMITY SENSOR 902

MICROPHONE 914

INERTIAL MEASUREMENT UNIT (IMU) 904

FORCE SENSITIVE RESISTOR (FSR) SENSOR 916

SWITCH 906

...

MAGNETIC SENSOR 908

OTHER SENSOR(S) 918

CAMERA 910

OUTPUT DEVICE(S) 818

DISPLAY
920

SPEAKER(S)
922

LIGHT SOURCES
332

OTHER OUTPUT DEVICE(S)
924

WIRELESS CHARGER FOR WEARABLE DEVICE

BACKGROUND

Wireless charging of a rechargeable portable device is a convenient alternative to use of physical connectors to transmit electrical power, which may wear, corrode, allow ingress of contaminants, and so forth.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features.

FIG. 5 is a diagram depicting a diagrammatic side view of the charging device of FIGS. 1-4 engaged with a head-mounted wearable device (HMWD), in which the positioning of internal and external components of the HMWD relative to the charging device is visible.

Figure 1:
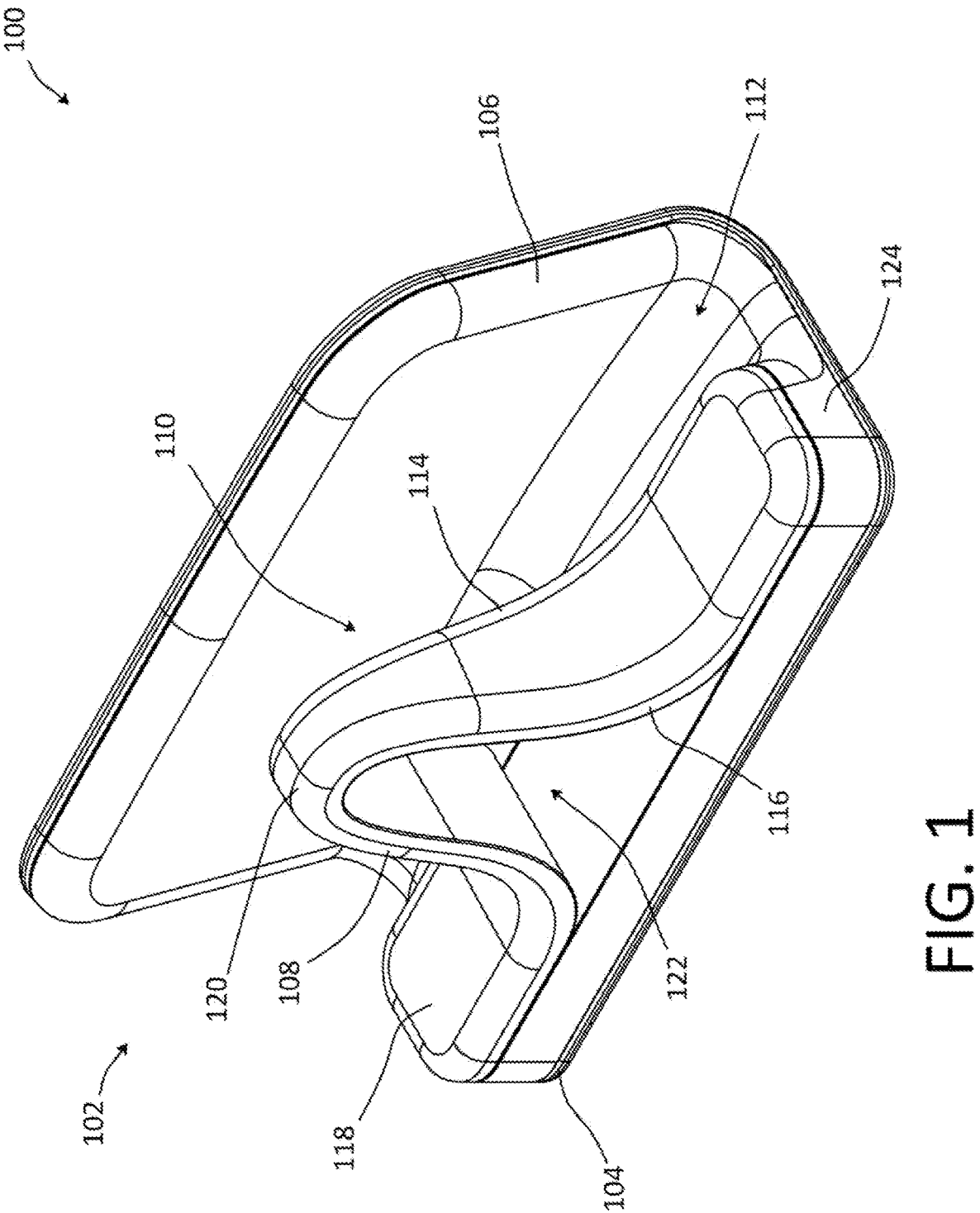
FIG. 1 is a diagram depicting a perspective view of an implementation of a charging device that may be used to provide electrical power to a head-mounted wearable device.

While implementations are described in this disclosure by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used in this disclosure are for organizational purposes only and are not meant to be used to limit the scope of the description or the claims. As used throughout this application, the word "may"

is used in a permissive sense (i.e., meaning having the potential to) rather than the mandatory sense (i.e., meaning must). Similarly, the words "include", "including", and "includes" mean "including, but not limited to".

DETAILED DESCRIPTION

Portable computing devices may be used to provide a variety of functions to a user. For example, a wearable computing device may include various sensors, input devices, output devices, and so forth to enable a user to access data, provide input such as voice commands, receive output such as audio or display output, and so forth. Continuing the example, a wearable device may include a head-mounted wearable device (HMWD), which may have a form factor of glasses. In such a case, the HMWD may include a front frame with a nose bridge that contacts the nose of a user when worn, and temples that are movable relative to the front frame to support the HMWD on the ears of the user when the HMWD is worn, and that fold into a compact position when the HMWD is not worn. In some cases, the lenses or front frame may include visual output devices such as displays or light sources. The temples may include input and output devices such as microphones, speakers, buttons, and so forth, and circuitry to process input or output, exchange data with other devices, and so forth. The temples may also include one or more power storage devices, such as rechargeable batteries, and charging circuitry that includes a receiving antenna capable of receiving electrical power from a charging antenna of a wireless charging device.

To recharge a power storage device of an HMWD using a wireless charging device, the receiving antenna of the HMWD may be positioned proximate to a charging antenna of the charging device, and retained in a position suitable to receive electrical power from the charging antenna throughout the charging process. The efficiency of the charging process is improved if the receiving antenna of the HMWD is maintained in close proximity to the charging antenna of the charging device, such as within 4 millimeters (mm). In cases where the HMWD is not physically engaged with the charging device, movement of the HMWD or charging device may hinder charging of the power storage device. However, frequent physical engagement and disengagement between the HMWD and charging device may cause wear and possible damage to components of the HMWD or charging device. Additionally, even in cases where the HMWD is physically engaged with the charging device, movement of movable parts of the HMWD, such as the temples, during engagement or during the charging process may hinder charging of the power storage device. For example, if an HMWD includes a receiving antenna in a temple, movement of the temple may position the receiving antenna in an unsuitable location relative to the charging antenna. Further, the form factor of a particular HMWD may differ from that of many other devices, and in some cases, the form factor of the particular HMWD may be changeable, such as by replacing or adjusting a front frame of the device. Therefore, a charging device that engages or accommodates a particular HMWD is typically designed with features specific for engaging the particular HMWD, and may not be usable with other form factors or devices.

This disclosure describes a charging device for HMWDs that holds an HMWD in a position to wirelessly receive electrical power from the charging device, and that can be used to charge HMWDs having different frame sizes and designs. The charging device engages the nose bridge of the HMWD, rather than other portions of the front frame, and may therefore be use for HMWDs having different sizes and form factors. The charging device includes a base, a sidewall that extends upward at an angle from the base, and a bridge support that extends upward from the base and is spaced apart from the sidewall.

In some implementations, circuitry for receiving electrical power from an external power source, such as a connection to an electrical outlet, may be included within the base. In other implementations, circuitry for receiving electrical power may be within another portion of the charging device, such as the sidewall.

One or more charging antennas in the sidewall receive electrical power from the circuitry and provide the electrical power to an HMWD that is positioned in the space between the sidewall and bridge support. For example, when the temples of the HMWD are positioned in the space between the sidewall and the bridge support, receiving antennas within the temples of the HMWD are positioned proximate to the charging antenna(s) within the sidewall.

In some implementations, the base may include one or more weights, such as a metal plate or ballast weight, to lower the center of gravity of the charging device and reduce the potential for tipping or movement of the charging device caused by engagement with the HMWD.

To engage an HMWD with the charging device, the nose bridge of the HMWD is placed in contact with the top of the bridge support. For example, the top of the bridge support may have a curved shape, or another shape that is complementary to the shape of the nose bridge. In some implementations, the bridge support may have a shape similar to that of a portion of a human nose that would contact the nose bridge when the HMWD is worn. When the nose bridge of the HMWD is placed on the bridge support, the temples of the HMWD extend into the space between the bridge support and sidewall, which positions receiving antennas within the temples proximate to the charging antenna(s) of the charging device. Contact between the nose bridge of the HMWD and the bridge support constrains movement of the HMWD toward the base of the charging device. The side of the bridge support that faces the sidewall constrains movement of the temples of the HMWD away from the charging antenna(s), while the sidewall constrains movement of the HMWD in the opposite direction. The height of the bridge support relative to the base may be selected such that if the temples of the HMWD move toward an open position during engagement with the charging device or during the charging process, contact between the temple(s) and the base constrains movement of the temple(s), which retains the receiving antenna(s) within the temples to a range of positions that are proximate to the charging antenna(s) and may continue to receive electrical power from the charging device.

The HMWD may be engaged with the charging device by contacting the nose bridge with the bridge support, in a generally vertical manner such as by lowering the HMWD toward the charging device while placing the temples of the HMWD in the space between the sidewall and bridge support. Use of the bridge support to support the HMWD does not require engagement between the charging device and other portions of the front frame of the HMWD. Because front frames may include a large variety of shapes, dimensions, and features for functional or aesthetic purposes, a charging device that engages a particular type of front frame may not be usable for other form factors. However, the shape of a nose bridge, which is generally complementary to the shape of a human nose, is typically consistent among different frames. As a result, the charging device may be used with different HMWDs, independent of the characteristics of the front frame of the HMWDs. Additionally, engagement between an HMWD and a charging device that does not require engagement with the front frame may reduce the potential for wear or damage to components of the HMWD or charging device. In some implementations, the bridge support of the charging device may be removeable and replaceable, or adjustable, to accommodate multiple types of nose bridges.

Positioning the temples of the HMWD in the space between the bridge support and sidewall positions the receiving antennas within the temples proximate to the charging antenna(s) within the sidewall without requiring physical engagement of the temples, which may potentially cause wear or damage to the temples or charging device. The width of the space between the bridge support and sidewall may be sized to be larger than the width of the temples, but narrow enough to limit movement of the temples away from the charging antenna(s). For example, a small air gap, such as 0.5 to 1 millimeter (mm) may exist between the temples and the surfaces of the sidewall and bridge support.

In some implementations, the sidewall may extend from the base at a non-perpendicular angle. In a similar manner, the side of the bridge support that faces the sidewall may also extend from the base at the non-perpendicular angle. In such a case, the space between the bridge support and sidewall would extend at a non-perpendicular angle relative to the base (e.g., an angle other than true vertical), which may facilitate ease of placement of the temples between the bridge support and sidewall when engaging the HMWD with the charging device. Additionally, the angle of the space may enable the side of the bridge support to provide additional support to the temples of the HMWD in cases where the temples contact the bridge support. In some implementations, the bridge support, and in some cases one or more other portions of the HMWD such as the sidewall or base, may have an elastomeric coating or other type of surface feature to increase friction between the HMWD and the charging device to limit movement of the HMWD when contacting the charging device. In some cases, the coating may also function to reduce the potential for wear or damage to the HMWD or charging device. In some implementations, the exterior of the charging device may include silicone rubber, which may provide insulation against temperature and electrical current, increase friction between the charging device and HMWD, and reduce the potential for wear or damage caused by contact between the charging device and HMWD.

The height of the bridge support may be less than the length of the temples, such that if a temple of the HMWD opens while the HMWD is engaged with the charging device, the temple will contact the base and be constrained from further movement. Constraining movement of the temples retains the receiving antennas within the temples proximate to the charging antenna(s) within the sidewall. For example, the charging antenna(s) may be configured to provide electrical power to receiving antennas located in a particular portion of the space between the sidewall and bridge support (e.g., a range of possible positions for the receiving antennas at which the receiving antennas may receive electrical power from the charging device).

In some cases, the HMWD may be configured to determine whether the HMWD is currently being worn by a user. This determination may be used to control functions of the HMWD. For example, the HMWD may initiate a low power or inactive state in response to a determination that the HMWD is not worn, and may initiate an active state in response to a determination that the HMWD is worn. One method that may be used to determine whether the HMWD is worn may include use of a magnetic sensor, such as a Hall effect sensor, to detect the presence of an object, such as the head of a user, between the temples of the HMWD. The manner in which the charging device supports the HMWD does not position a portion of the charging device between the temples of the HMWD, even in cases where the temples achieve a partially open position. As a result, the HMWD may remain in an inactive state independent of the position of the temples during the charging process.

In some implementations, the charging device, the HMWD, or both the charging device and HMWD may include one or more temperature sensors that determine a temperature of the charging antenna(s), receiving antennas, power storage device of the HMWD, or other components of the HMWD or charging device. The charging process may be controlled based on the determined temperature. For example, the charging device may include circuitry to change the amount of electrical power provided to the HMWD based on a relationship between the determined temperature and a threshold temperature. Continuing the example, in response to a temperature that exceeds a threshold temperature, the quantity of electrical power provided to the HMWD may be decreased. In other implementations, the HMWD may include circuitry or computer-executable instructions to provide data or a signal to the charging device based on a relationship between the determined temperature and a threshold temperature.

FIG. 1 is a diagram 100 depicting a perspective view of an implementation of a charging device 102 that may be used to provide electrical power to a head-mounted wearable device (HMWD). The charging device 102 may include a base 104, a first support such as a sidewall 106 that extends at an angle from the base 104, and a second support such as a bridge support 108 that extends from the base 104. The sidewall 106 and bridge support 108 may be spaced from one another to define a space 110 between the sidewall 106 and bridge support 108 for accommodating one or more portions of the HMWD, such as the temples of the HMWD. As shown in FIG. 1, in some implementations, the sidewall 106 may extend from the base 104 at a non-perpendicular angle 112 relative to the base 104. For example, the sidewall 106 may extend from the base 104 at an angle 112 that is inclined toward the side of the charging device 102 that includes the bridge support 108. At least a portion of the bridge support 108 may also extend from the base 104 at the non-perpendicular angle 112. For example, the bridge support 108 is depicted having a first side 114 that faces the sidewall 106 and a second side 116 opposite the first side 114. FIG. 1 depicts the first side 114 extending from the base 104 at the non-perpendicular angle 112, while the second side 116 extends generally perpendicular from the base 104. However, in other implementations, both sides of the bridge support 108 may extend from the base 104 at the same angle. Additionally, while FIG. 1 depicts the first side 114 of the bridge support 108 and the sidewall 106 extending from the base 104 at the same angle 112, in other implementations, the bridge support 108 and sidewall 106 may extend from the base 104 at different angles.

The angle 112 at which the sidewall 106 and first side 114 of the bridge support 108 extend from the base 104 provides the space 110 between the bridge support 108 and sidewall 106 with an angle 112 relative to the base 104. An angled space 110 may facilitate ease of placement of the temples of an HMWD between the bridge support 108 and the sidewall 106 when engaging the HMWD with the charging device 102. Additionally, the angle of the space 110 may enable the first side 114 of the bridge support 108 to provide additional support to the temples of the HMWD in cases where the temples contact the bridge support 108. In some implementations, the angle 112 between the base 104 and sidewall 106 may be adjustable. For example, the sidewall 106 may be movably attached to the base 104 using one or more hinges. In some cases, at least a portion of the sidewall 106 may be movable toward or away from the base 104. For example, a first portion of the sidewall 106 may move in a telescoping matter relative to a second portion of the sidewall 106 to enable a height of the sidewall 106 to be changed. Adjustment of the angle 112 and height of the sidewall 106 may enable the width and angle of the space 110 to be changed to accommodate HMWDs having different dimensions or external characteristics.

The bridge support 108 is shown having a curved shape defined by a bottom portion 118 that is attached to the base 104 at two positions, and a top portion 120 that is spaced from the base 104 to define a space 122 between the top portion 120 and the base 104. Specifically, the bottom portion 118 of the bridge support 108 is shown attached proximate to the lateral sides 124 of the base 104 that extend perpendicular relative to the sidewall 106 and bridge support 108. In other implementations, other shapes of support members may be used. For example, any manner of support having a portion configured to contact or support the nose bridge of an HMWD and constrain movement of the HMWD toward the base 104 may be used. As shown in FIG. 1, the top portion 120 of the bridge support 108 may have a curved shape, which may be complementary to a shape of one or more nose bridges of one or more HMWDs. In other implementations, a bridge support 108 having one or more other shapes may be used. In some cases, the bridge support 108 may be removable from the base 104 and replaceable to enable other types of bridge supports 108 to be used. In other implementations, one or more portions of the bridge support 108 may be adjustable, such as to change a dimension (e.g., height or width) of at least a portion of the bridge support 108. In some implementations, a portion of the base 104 proximate to the space 122 between the bridge support 108 and base 104 may include a visual indicator, such as a light emitting diode (LED) or other type of light source, which may be used to indicate an activity, status, or other information associated with the charging device 102. Placement of a light source within the space 122 of the bridge support 108 may at least partially occlude the light source, which may improve visibility of the light source in cases where ambient light proximate to the charging device 102 is present, enabling less power to be used to cause the light source to emit light that is visible to a user. Additionally, occlusion of the light source by the bridge support 108 may prevent the light source from providing an undesirable amount of light in cases where ambient light proximate to the charging device 102 is low, such as if the charging device 102 is placed near a location where a user sleeps. In some implementations, at least a portion of the sidewall 106, bridge support 108, and in some cases the base 104, may include a coating to provide friction between portions of the HMWD and charging device 102 that are in contact. In some cases, the coating may include an elastomer, such as silicone. In other cases, the coating may include one or more polymers, composites, metals, and so forth. For example, the coating may include rubber or plastic, one or more textured materials to provide friction between contacting surfaces, and so forth.

In use, the nose bridge of an HMWD may be placed into contact with the top portion 120 of the bridge support 108. Contact between the bridge support 108 and nose bridge may constrain movement of the HMWD toward the base 104. At least a portion of the temples of the HMWD may extend into the space 110 between the bridge support 108 and sidewall 106. The temples of the HMWD may include receiving antennas to receive electrical power to recharge one or more power storage devices of the HMWD. Placement of the temples within the space 110 may position the receiving antennas of the HMWD proximate to one or more charging antennas within the sidewall 106. The charging antennas may receive electrical power from a power source and provide electrical power to the receiving antennas within the space 110. For example, the base 104 or another portion of the charging device 102 may include circuitry that may be connected to a source of power, such as through wired engagement, and the charging antennas may be electrically coupled with this circuitry. In some cases, a light source within the space 122 of the bridge support 108 may indicate information about the charging process, such as whether charging of the power storage device of an HMWD is currently taking place, has completed, and so forth. As described previously, in some implementations, the charging device 102 may include temperature sensors or other components to determine a temperature of one or more portions of the charging device 102 or HMWD and to control the provision of electrical power to the HMWD based on this temperature. In other implementations, the charging device 102 may receive data or signals from the HMWD based on a temperature determined using one or more components of the HMWD, and the provision of electrical power may be controlled based on the received data or signals.

Figure 2:
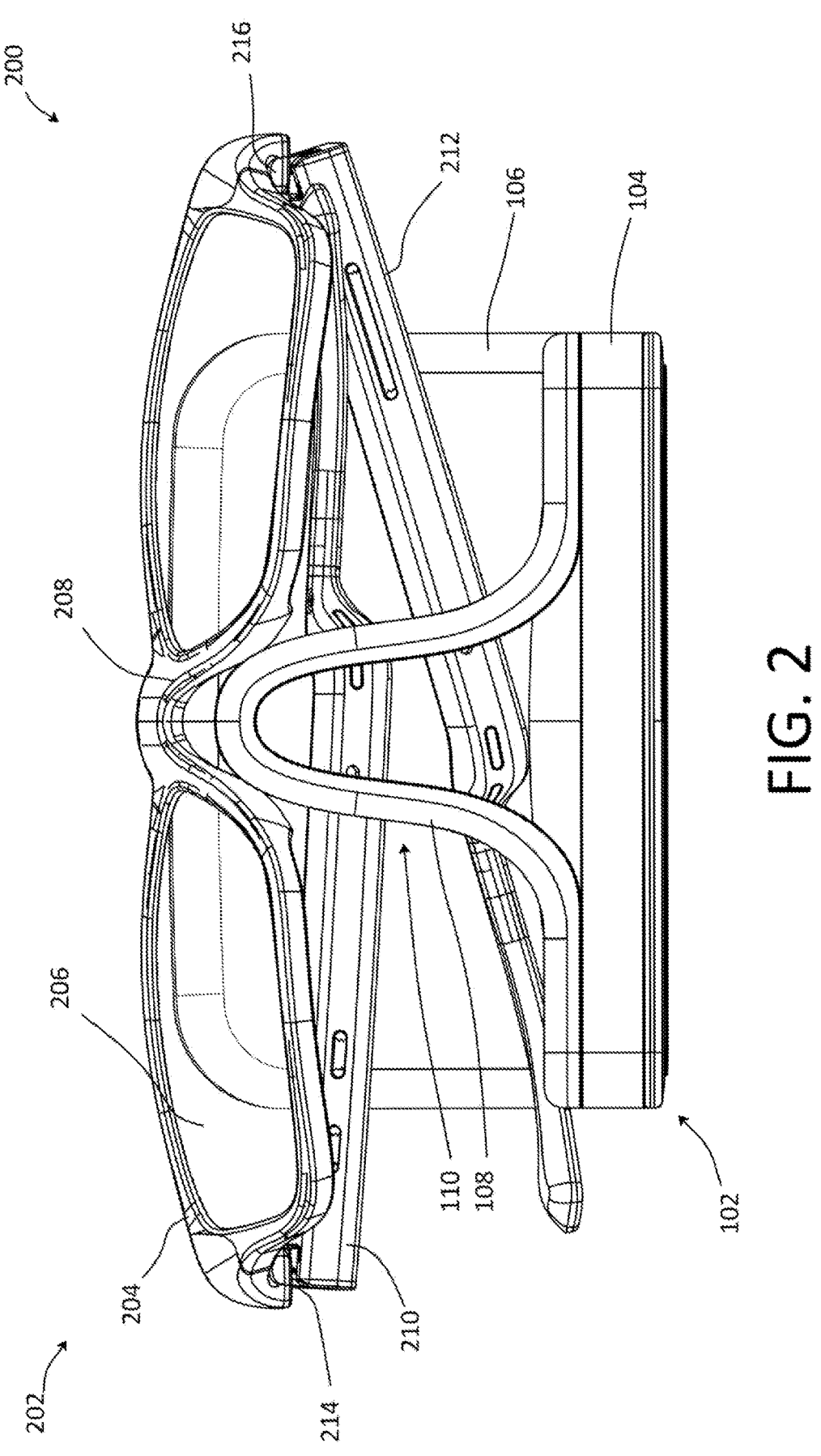
FIG. 2 is a diagram depicting a front view of the charging device of FIG. 1 engaged with a head-mounted wearable device.

FIG. 2 is a diagram 200 depicting a front view of the charging device 102 of FIG. 1 engaged with a head-mounted wearable device (HMWD) 202. The HMWD 202 may include a front frame 204 that includes a left side and right side, each side of the front frame 204 enclosing a lens 206. In other implementations, the HMWD 202 may exclude lenses 206. The front frame 204 may also include a nose bridge 208 that connects the left side and right side of the front frame 204. The nose bridge 208 may have a generally curved shape complementary to the shape of a human nose. For example, the nose bridge 208 may rest on or be positioned around the nose of a user when the HMWD 202 is worn.

The HMWD 202 may include a first temple 210 attached to a first side of the front frame 204 and a second temple 212 attached to a second side of the front frame 204. The first temple 210 and second temple 212 may include various types of circuitry and other components of the HMWD 202. For example, one or both of the temples may include input devices such as buttons or microphones, output devices such as speakers, light sources, haptic components, display devices, processors and memory or other types of circuitry for processing input and output, wireless communication components, and so forth. One or both of the temples may include a power storage device, such as a rechargeable battery, for providing electrical power to components of the HMWD 202. The power storage device(s) may be associated with one or more receiving antennas that may receive electrical power from one or more charging antennas of the charging device 102 when the HMWD 202 is engaged with the charging device 102, and provide the electrical power to the power storage device(s).

The first temple 210 may be movably attached to the front frame 204, such as through use of a first hinge 214. The second temple 212 may be movably attached to the front frame 204, such as through use of a second hinge 216. For example, each temple may be movable between an open position that enables positioning of the temple over the ear of a user when worn, and a closed position that reduces one or more dimensions of the HMWD 202 for storage. Continuing the example, FIG. 2 depicts the first temple 210 in a closed position, in which the first temple 210 is pivoted to a position that is proximate to the front frame 204. The second temple 212 is shown in a partially open position, in which the second temple 212 is pivoted outward from the front frame 204.

To engage the HMWD 202 with the charging device 102, the nose bridge 208 of the HMWD 202 may be positioned in contact with the bridge support 108 of the charging device 102. In some implementations, the bridge support 108, or a coating provided on the bridge support 108, may have a curved shape that is complementary to the shape of the nose bridge 208. Contact between the nose bridge 208 and the bridge support 108 may constrain the front frame 204 from movement toward the base 104 of the charging device 102. The first temple 210 and second temple 212 of the HMWD 202 may extend into the space 110 between the sidewall 106 and bridge support 108 of the charging device 102. As described previously, one or more of the first temple 210 or second temple 212 may include a receiving antenna that may wirelessly receive electrical power from one or more charging antennas of the charging device 102. The charging device 102 may include one or more charging antennas within the sidewall 106. Therefore, positioning of the first temple 210 and second temple 212 within the space 110 between the bridge support 108 and sidewall 106 may position the receiving antennas of the HMWD 202 proximate to the charging antenna(s) of the charging device 102, in a position suitable to receive electrical power from the charging antenna(s).

The position of the top of the bridge support 108 relative to the base 104 may enable electrical power to be provided from the charging device 102 to the HMWD 202 independent of the position of the temples of the HMWD 202. For example, during engagement of the HMWD 202 to the charging device 102, or during the charging process, one or both temples of the HMWD 202 may move from the closed position toward the open position. Continuing the example, FIG. 2 depicts the second temple 212 in a partially open position. Contact between the base 104 and the second temple 212 may constrain the second temple 212 from further movement toward the open position, and may therefore also constrain movement of a portion of the second temple 212 that includes the receiving antenna away from the charging antenna of the sidewall 106. Contact between the base 104 and the second temple 212 may thereby retain the receiving antenna of the second temple 212 within a range of positions that may receive electrical power from the charging antenna within the sidewall 106 and constrain movement of the second temple 212 to a position that would prevent the receiving antenna of the second temple 212 from receiving electrical power from the charging device 102. In a similar manner, contact between the base 104 of the charging device 102 and the first temple 210 of the HMWD 202 may constrain movement of the first temple 210 such that the receiving antenna of the first temple 210 remains within a range of positions that may receive electrical power from a charging antenna within the sidewall 106.

The height of the bridge support 108 may also be selected such that when the first temple 210 or second temple 212 are in the closed position, receiving antennas within the temples are retained within a range of positions suitable for receiving electrical power from a charging antenna within the sidewall 106. For example, FIG. 2 depicts the first temple 210 in the closed position. Contact between the first temple 210 and the front frame 204 of the HMWD 202 may constrain the first temple 210 from further vertical movement upward relative to the charging device 102, while contact between the bridge support 108 and the nose bridge 208 may constrain the HMWD 202 from vertical movement downward toward the base 104. As a result, the receiving antenna of the first temple 210 is retained in a range of positions that are proximate to a charging antenna within the sidewall 106. Movement of the second temple 212 toward the closed position may be similarly constrained to retain the receiving antenna of the second temple 212 in a range of positions suitable to receive electrical power from the charging device 102. Further, because the bridge support 108 is used to constrain movement of the HMWD 202 toward the base 104 by contacting the nose bridge 208, contact between the charging device 102 and other portions of the front frame 204 of the HMWD 202 is not necessary. As a result, the charging device 102 may be used with multiple types of HMWD 202 having different front frames 204 with different form factors. For example, an HMWD 202 may include a front frame 204 that is removable and replaceable, or adjustable to change a shape or dimension thereof, and the charging device 102 may be usable with the HMWD 202 independent of the form factor of the front frame 204.

Figure 3:
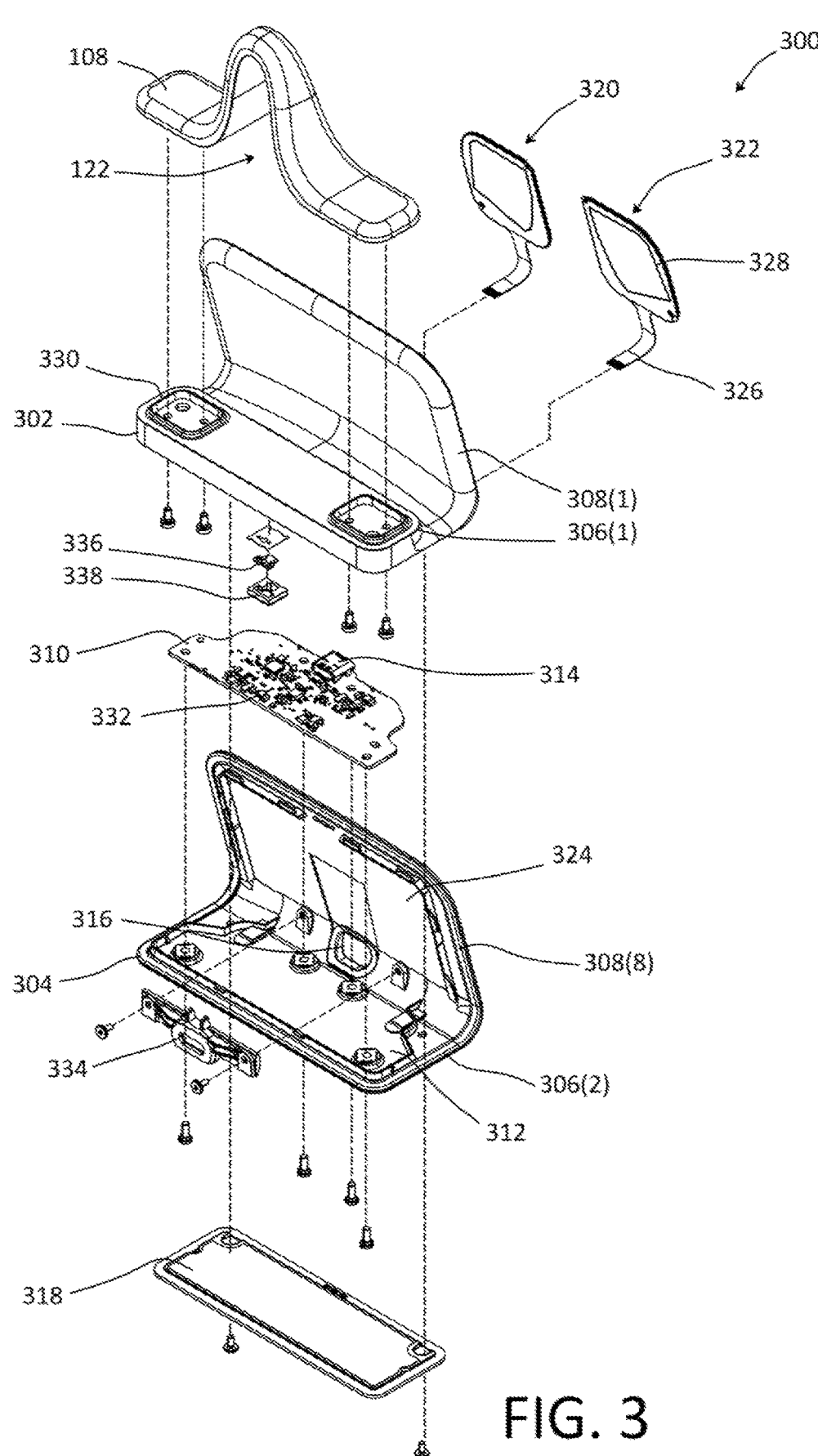
FIG. 3 is a diagram depicting an exploded view that illustrates various components of the charging device of FIG. 1.

FIG. 3 is a diagram 300 depicting an exploded view that illustrates various components of the charging device 102 of FIG. 1. As described previously, the charging device 102 may include a base 104, and a sidewall 106 and bridge support 108 that extend at an angle 112 from the base 104. As shown in FIG. 3, in some implementations, the base 104 and the sidewall 106 of the charging device 102 may be formed by engaging an inner housing 302 with an outer housing 304. For example, the inner housing 302 may have an angled shape, in which a base portion 306(1) is positioned at an angle relative to a side portion 308(1). Similarly, the outer housing 304 may have an angled shape that is complementary to the angled shape of the inner housing 302, which may include a base portion 306(2) positioned at an angle relative to a side portion 308(2). When the inner housing 302 is engaged to the outer housing 304, the base portion 306(1) of the inner housing 302 and the base portion 306(2) of the outer housing 304 may be engaged to form the base 104 of the charging device 102, as shown in FIGS. 1 and 2. Similarly, when the inner housing 302 is engaged to the outer housing 304, the side portion 308(1) of the inner housing 302 and the side portion 308(2) of the outer housing 304 may be engaged to form the sidewall 106 of the charging device 102, as shown in FIGS. 1 and 2. While FIG. 3 depicts the inner housing 302 and the outer housing 304 as unitary structures, in other implementations, one or more of the inner housing 302 or outer housing 304 may include multiple parts. In some implementations, the exterior surfaces of the inner housing 302 and outer housing 304, when assembled, may include an elastomeric coating, which may reduce the potential for wear or damage to the charging device 102 and may provide friction between the charging device 102 and portions of the HMWD 202 that contact the charging device 102.

As described previously, in some implementations, the charging device 102 may include charging circuitry 310 positioned within the base 104. For example, one or both of the inner housing 302 or outer housing 304 may include a recess 312 for receiving and containing the charging circuitry 310, such that when the inner housing 302 is engaged to the outer housing 304, the charging circuitry 310 is contained within the base 104. In other implementations, one or more other portions of the charging device 102 may contain charging circuitry 310. For example, a recess 312 suitable to contain the charging circuitry 310 may be formed in one or more other parts of the charging device 102.

The charging circuitry 310 may include a circuit board having various components that may be used to receive electrical power from a source of electrical power, provide electrical power to other components of the charging device 102, process data or signals from other devices, and so forth. For example, the charging circuitry 310 may be associated with a power connector 314 that may be used to engage the charging circuitry 310 with a source of electrical power external to the charging device 102 through one or more ports 316 in the outer housing 304. In some implementations, the power connector 314 may include a Universal Serial Bus (USB) connector. A power bracket 334 may be secured over the power connector 314 and port 316. The power bracket 334 may include one or more openings to accommodate passage of at least a portion of the power connector 314, or one or more external connectors that are used to engage the power connector 314.

In some implementations, the circuit board that includes charging circuitry 310 may also include one or more other components of the charging device 102. For example, the charging device 102 may include one or more wireless communication interfaces that may enable the charging device 102 to exchange data with other devices using one or more networks. In some implementations, the circuit board may include one or more connectors, such as universal serial bus (USB) connectors, for engaging other computing devices or data storage devices. The charging device 102 may include one or more output devices, such as displays or speakers, that may be controlled using the circuit board. For example, data received using a communication interface, or data stored in memory associated with the charging device 102, may be used to generate output. Continuing the example, the charging device 102 may be used to present a clock, calendar, or other type of information, output audio, and so forth. The charging device 102 may additionally include one or more input devices, such as a microphone, camera, buttons, touch sensors or other types of sensors, and so forth. For example, output devices may also be used to present visible or audio user interfaces, while input provided to the input devices may be used to navigate or control the user interfaces, cause the charging device 102 to perform various functions, and so forth.

In some implementations, one or more weights 318 may be attached to the outer housing 304 or contained within the outer housing 304 and inner housing 302. For example, a weight 318 may include a metallic plate, a ballast weight, or one or more other components that may lower a center of gravity associated with the charging device 102 and reduce the potential for movement or tipping (e.g., rotation) of the charging device 102. Continuing the example, inclusion of one or more weights 318 within or secured to the base 104 may reduce the potential for the charging device 102 to slide in a lateral direction, or tip over, during engagement or removal of an HMWD 202, and during the charging process.

As described with regard to FIGS. 1 and 2, one or more charging antennas may be positioned within the sidewall 106 of the charging device 102. Specifically, FIG. 3 depicts a first charging antenna 320 and a second charging antenna 322 that may be positioned within a recess 324 within one or more of the inner housing 302 or outer housing 304, such that when the inner housing 302 is engaged to the outer housing 304, the charging antennas are contained within the sidewall 106 of the charging device 102. In some implementations, the charging antennas may include "Poller" antennas that transmit electrical power to a corresponding "listener" antenna of an HMWD 202. For example, a charging antenna may include one or more coils of electromagnetic material, that may be tightly-coupled on a substrate in one or multiple layers. The coils of material may be arranged in concentric circles, elliptical or oblong shapes, square or rectangular shapes, and so forth. The charging antennas may each include one or more electrical conductors 326, such as a ribbon cable, that engage the charging circuitry 310, to receive electrical power from a source of electrical power via the charging circuitry 310, and engage a portion of the charging antenna that is usable to transmit electrical power, denoted as a transmission antenna boundary 328. The charging antennas may transmit the received electrical power to a receiving antenna within the space 110 adjacent to the sidewall 106. While FIG. 3 depicts the charging device 102 including two charging antennas, in other implementations, a single charging antenna, or more than two charging antennas, may be used.

As described with regard to FIG. 1, the bridge support 108 may include a curved shape in which a bottom portion 118 is attached to the base 104 of the charging device 102, while a top portion 120 is spaced from the base 104 to define a space 122. FIG. 3 depicts the inner housing 302 including two attachment points 330 to which bottom portions 118 of the bridge support 108 may be engaged. For example, one or more of the inner housing 302 or the bridge support 108 may include a protruding region that is received within a complementary recessed region of the other component, and one or more fasteners or other methods of engagement may be used to secure the bridge support 108 to the attachment points 330 of the inner housing 302.

In some implementations, one or more light sources 332, such as LEDs, electroluminescent devices, quantum dots, and so forth may be associated with the charging circuitry 310 and oriented to emit light from the base 104 at a location within the space 122 of the bridge support 108. One or more light guides 336 may be used to direct light from the light source 332 toward the base 104, or toward one or more other portions of the device. A light cover 338, such as a rubber gasket or other type of opaque material, may be positioned between the light guide 336 and light source 332. Placement of a light source 332 to emit light from within the space 122 defined by the bridge support 108 may cause light emitted by the light source 332 to be at least partially occluded by the bridge support 108. Occlusion of the light in this manner may improve visibility of the light when ambient light is present, and may provide the emitted light with a suitable intensity when ambient light is low.

Figure 4:
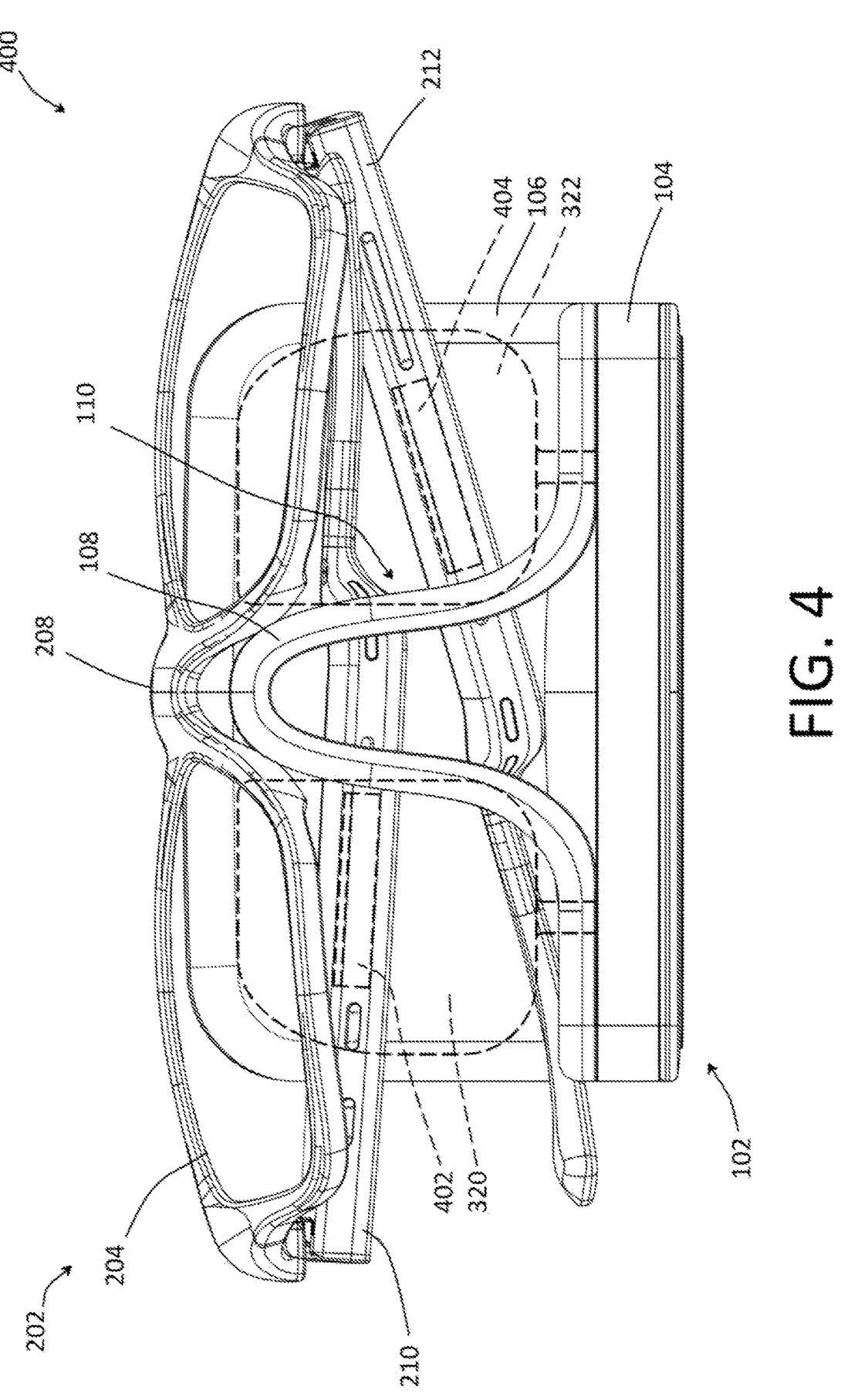
FIG. 4 is a diagram depicting a diagrammatic front view of the charging device of FIGS. 1-3 engaged with a head-mounted wearable device, in which positions of internal components of the charging device to internal components of the head-mounted wearable device are visible.

FIG. 4 is a diagram 400 depicting a diagrammatic front view of the charging device 102 of FIGS. 1-3 engaged with a head-mounted wearable device (HMWD) 202, in which positions of internal components of the charging device 102 relative to internal components of the head-mounted wearable device (HMWD) 202 are visible. As described with regard to FIGS. 1 and 2, an HMWD 202 may be engaged with a charging device 102 by placing the nose bridge 208 of the HMWD 202 proximate to the bridge support 108 of the charging device 108. Contact between the nose bridge 208 and bridge support 108 may constrain movement of the HMWD 202 toward the base 104 of the charging device 102 without requiring engagement between the front frame 204 of the HMWD 202 and the charging device 102.

Engagement of the HMWD 202 to the charging device 102 may also place at least a portion of the first temple 210 and second temple 212 within the space 110 between the bridge support 108 and sidewall 106 of the charging device 102. Contact between the base 104 and the first temple 210 or second temple 212 may constrain movement of the temples of the HMWD 202 toward an open position, while contact between the front frame 204 and temples may constrain movement of the temples beyond a closed position.

As described with regard to FIGS. 2 and 3, each temple of the HMWD 202 may include a receiving antenna that may receive electrical power from a charging antenna of the charging device 102 to recharge a power storage device of the HMWD 202. For example, the receiving antennas may include coil pads configured to receive electrical power from charging antennas that include coiled electromagnetic material. Specifically, FIG. 4 depicts the first temple 210 including a first receiving antenna 402 within the first temple 210 and the second temple 212 including a second receiving antenna 404 within the second temple 212. When the nose bridge 208 is placed proximate to the bridge support 108 and the first temple 210 and second temple 212 are placed within the space 110 between the bridge support 108 and sidewall 106, the first receiving antenna 402 within the first temple 210 is positioned proximate to the first charging antenna 320 within the sidewall 106. Similarly, the second receiving antenna 404 within the second temple 212 is positioned proximate to the second charging antenna 322 within the sidewall 106. Therefore, when the HMWD 202 is engaged with the charging device 102 as shown in FIGS. 2 and 4, electrical power may be provided from the charging antennas to the receiving antennas within the HMWD 202, to recharge one or more power storage devices of the HMWD 202.

Because contact between the bridge support 108 and nose bridge 208 and contact between the base 104 and temples constrain movement of the HMWD 202 relative to the charging device 102, the first receiving antenna 402 is retained within a first range of positions that may receive electrical power from the first charging antenna 320, and the second receiving antenna 404 is retained within a second range of positions that may receive electrical power from the second charging antenna 322. For example, FIG. 4 depicts the first temple 210 in a closed position that is constrained from further upward movement relative to the charging device 102. In such a case, the first receiving antenna 402 remains proximate to the first charging antenna 320 within the sidewall 106 and may continue to receive electrical power from the first charging antenna 320. Continuing the example, FIG. 4 depicts the second temple 212 in a partially open position that is constrained from further downward movement relative to the charging device 102 by contact with the base 104. In such a case, the second receiving antenna 404 remains proximate to the second charging antenna 322 within the sidewall 106 and may continue to receive electrical power from the second charging antenna 322. Therefore, independent of the movement or positions of the temples of the HMWD 102, the receiving antennas within the temples may remain within a range of positions suitable to receive electrical power from the charging antennas of the charging device 102.

Figure 5:
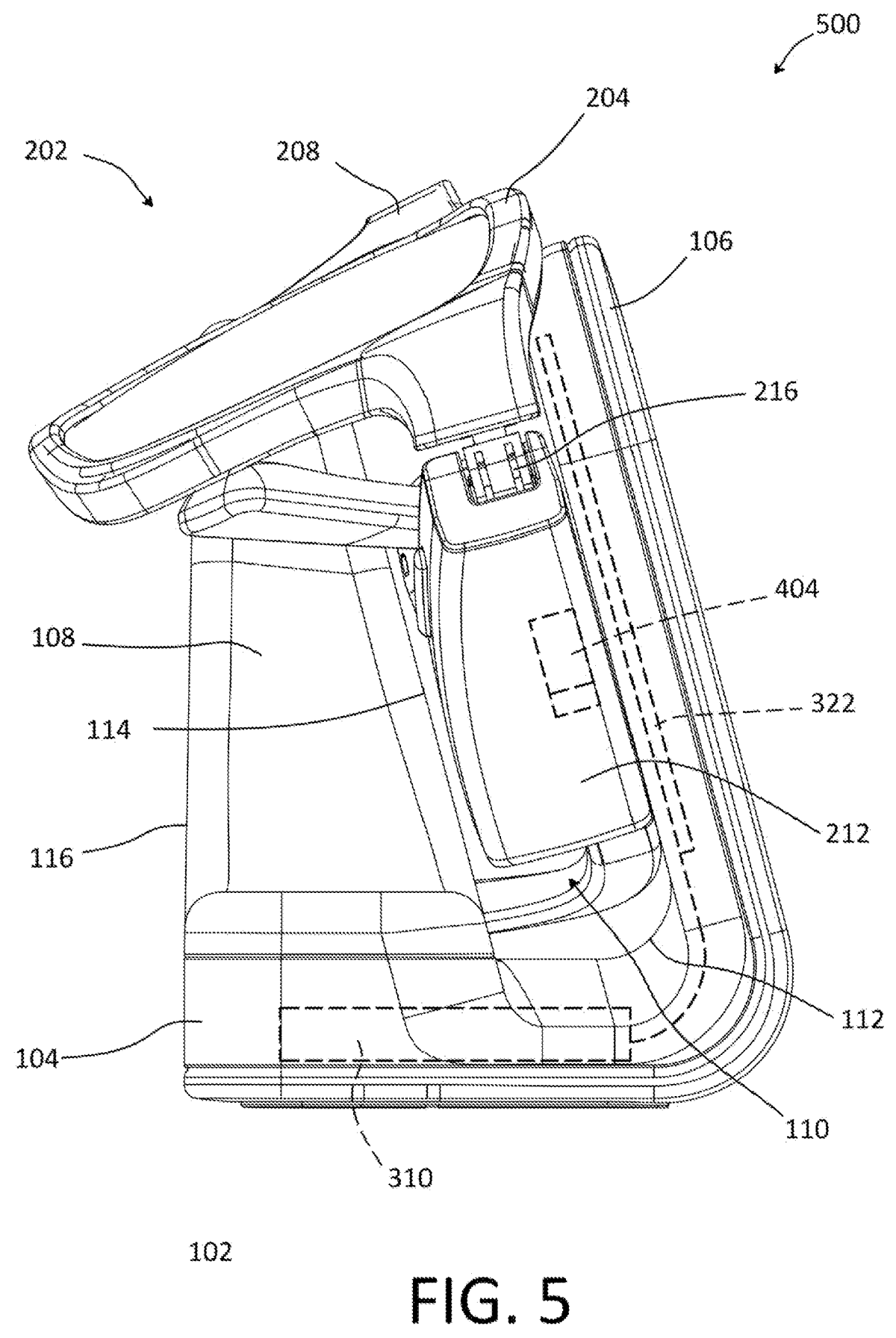

FIG. 5 is a diagram 500 depicting a diagrammatic side view of the charging device 102 of FIGS. 1-4 engaged with a head-mounted wearable device (HMWD) 202, in which the positioning of internal and external components of the HMWD 202 relative to the charging device 102 is visible. As described with regard to FIG. 1, the charging device 102 may include a base 104, a sidewall 106 that extends at an angle 112 relative to the base 104, and a bridge support 108 that extends from the base 104. The sidewall 106 and bridge support 108 are spaced from one another to define a space 110 between the sidewall 106 and bridge support 108. The sidewall 106 may extend from the base 104 at a non-perpendicular angle 112 relative to the base 104. For example, the sidewall 106 may be inclined toward the bridge support 108. The bridge support 108 may have a first side 114 that faces the sidewall 106 and a second side 116 opposite the first side 114, and the first side 114 may extend from the base 104 at the non-perpendicular angle 112. Therefore, the space 110 between the sidewall 106 and the bridge support 108 may have an angled orientation relative to the base 104. For example, FIG. 5 depicts the space 110 extending from the base 104 at the non-perpendicular angle 112, rather than extending directly vertical (e.g., perpendicularly) relative to the base 104. The non-perpendicular angle 112 of the space 110 relative to the base 104 may facilitate ease of placement of at least a portion of an HMWD 202 within the space 110. Additionally, in cases where one or both temples of the HMWD 202 contact the bridge support 108, the angle of the space 110 may enable contact with the bridge support 108 to at least partially support the HMWD 202 and constrain movement of the HMWD 202.

As described with regard to FIGS. 3-4, charging circuitry 310 may be contained within the base 104 or another portion of the charging device 102, and may function to receive electrical power from a source of electrical power and transmit the electrical power to the charging antennas of the charging device 102. One or more charging antennas, of which the second charging antenna 322 is visible in FIG. 5, may be within the sidewall 106 of the charging device 102, and may be positioned to receive electrical power from the charging circuitry 310 and transmit electrical power to a receiving antenna of an object within the space 110 that is proximate to the charging antenna.

When the HMWD 202 is engaged with the charging device 102, contact between the nose bridge 208 of the HMWD 202 and the bridge support 108 of the charging device 102 may constrain movement of the HMWD 202 toward the base 104. When the temples of the HMWD 202 are positioned within the space 110 between the bridge support 108 and the sidewall 106, contact between the temples and the bridge support 108 and sidewall 106 may constrain lateral movement of the HMWD 202 relative to the charging device 102, which may constrain movement of the receiving antennas within the temples of the HMWD 202 away from the charging antenna(s) of the charging device 102. Additionally, when the HMWD 202 is engaged with the charging device 102, contact between the base 104 of the charging device 102 and the temples, and in some implementations between the bridge support 108 of the charging device 102 and the temples, may constrain movement of the temples of the HMWD 202 toward the base 104 and retain the receiving antennas of the HMWD 202 in a range of positions suitable to receive electrical power from the charging antenna(s) of the charging device 102. For example, FIG. 5 depicts the second receiving antenna 404 within the second temple 212 of the HMWD 202 positioned within the space 110 of the charging device 102 and proximate to the second charging antenna 322. Because contact between the charging device 102 and the HMWD 202 constrains movement of the second receiving antenna 404, the second receiving antenna 404 is maintained within a range of positions that may receive electrical power from the second charging antenna 322.

Figure 6A:
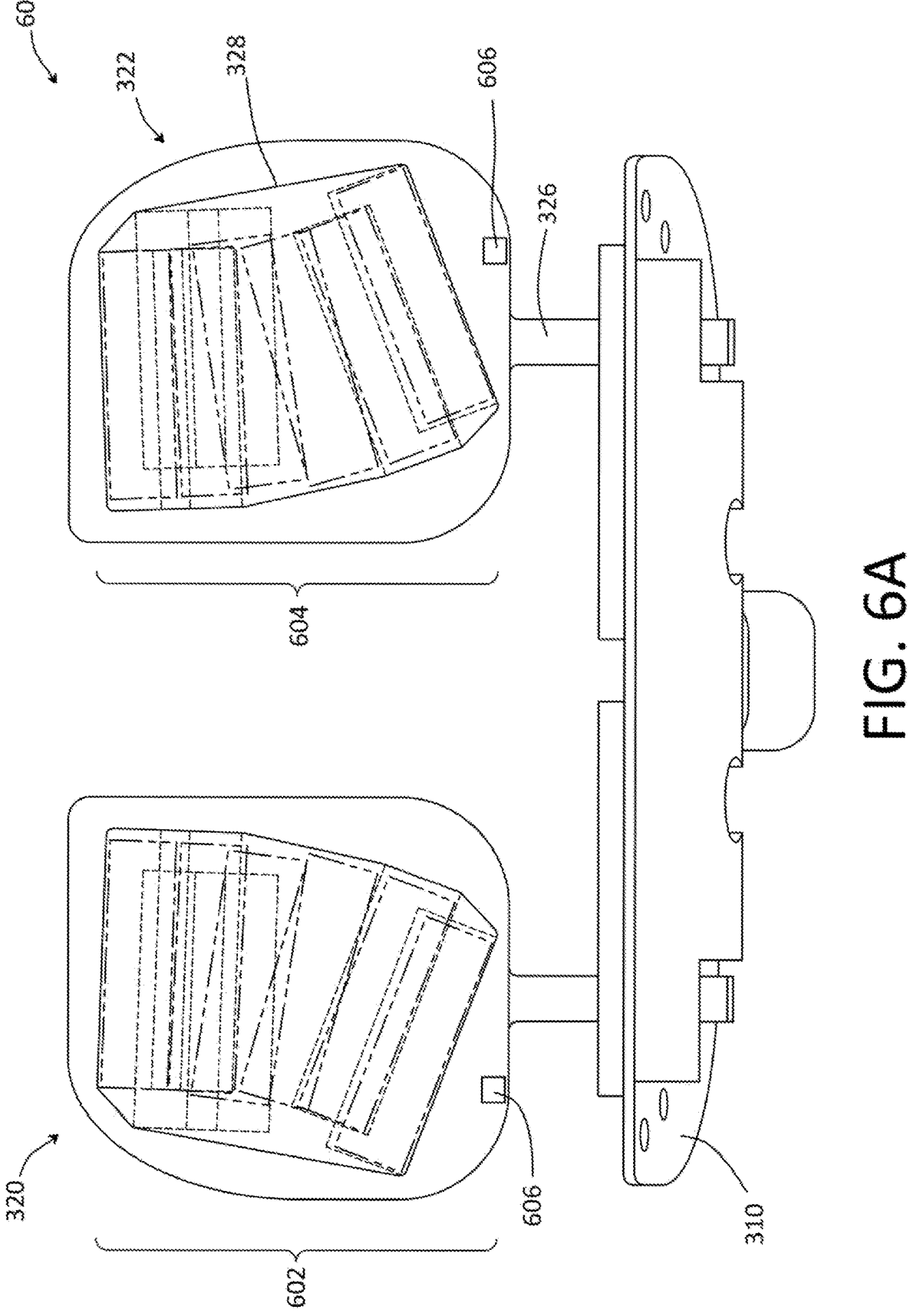
FIG. 6A is a diagram depicting a diagrammatic front view of the charging circuitry and charging antennas of the charging device of FIGS. 1-5, illustrating the ranges of positions that may be achieved by a receiving antenna of a head-mounted wearable device (HMWD) when the HMWD is engaged with the charging device.

FIG. 6A is a diagram 600 depicting a diagrammatic front view of the charging circuitry 310 and charging antennas of the charging device 102 of FIGS. 1-5, illustrating the ranges of positions that may be achieved by a receiving antenna of a head-mounted wearable device (HMWD) 202 when the HMWD 202 is engaged with the charging device 102. As described with regard to FIGS. 1-5, charging circuitry 310 may be contained within a base 104 or other portion of a charging device 102 and may receive electrical power from a source of electrical power. A first charging antenna 320 and second charging antenna 322 within the sidewall 106 of the charging device 102 may be electrically coupled with the charging circuitry 310, may receive electrical power from the charging circuitry, and may transmit the electrical power to a receiving antenna of an object proximate to the charging antennas. For example, a receiving antenna associated with an HMWD 202 may be placed in the space 110 between the sidewall 106 and bridge support 108 of the charging device 102 and may receive electrical power from one or more charging antennas of the charging device 102.

As described previously, contact between portions of the HMWD 202 and the bridge support 108, between the HMWD 202 and the base 104, and in some implementations between the HMWD 202 and the sidewall 106, may constrain movement of the HMWD 202 and the temples of the HMWD 202 relative to the charging device 102. As a result, a first receiving antenna 402 within the first temple 210 of the HMWD 202 may be retained within a first range of positions 602 relative to the first charging antenna 320 of the charging device 102, and a second receiving antenna 404 within the second temple 212 of the HMWD 202 may be retained within a second range of positions 604 relative to the second charging antenna 322 of the charging device 102.

As shown in FIG. 6A, the first range of positions 602 illustrates the maximum range of possible positions that the first receiving antenna 402 of the HMWD 202 may achieve when the HMWD 202 is engaged with the charging device 102. The first charging antenna 320 may provide electrical power to the first receiving antenna 402 when the first receiving antenna 402 is at any position within the first range of positions 602. Similarly, the second range of positions 604 illustrates the maximum range of possible positions that the second receiving antenna 404 of the HMWD 202 may achieve when the HMWD 202 is engaged with the charging device 102. The second charging antenna 322 may provide electrical power to the second receiving antenna 404 when the second receiving antenna 404 is at any position within the second range of positions 604. Therefore, engagement between the charging device 102 and HMWD 202 may constrain movement of the HMWD 202 such that the receiving antennas of the HMWD 202 are continuously retained in positions suitable to receive electrical power from the charging antennas of the charging device 102.

In some implementations, one or both of the charging antennas may include a temperature sensor 606 that may be used to determine a temperature of the charging antenna or other portion of the charging device 102. Data from the temperature sensor(s) 606 may be used to control a charge rate for a HMWD 202. For example, in response to a determined temperature that is greater than a threshold temperature, the rate at which electrical power is provided to an HMWD 202 may be reduced.

Figure 6B:
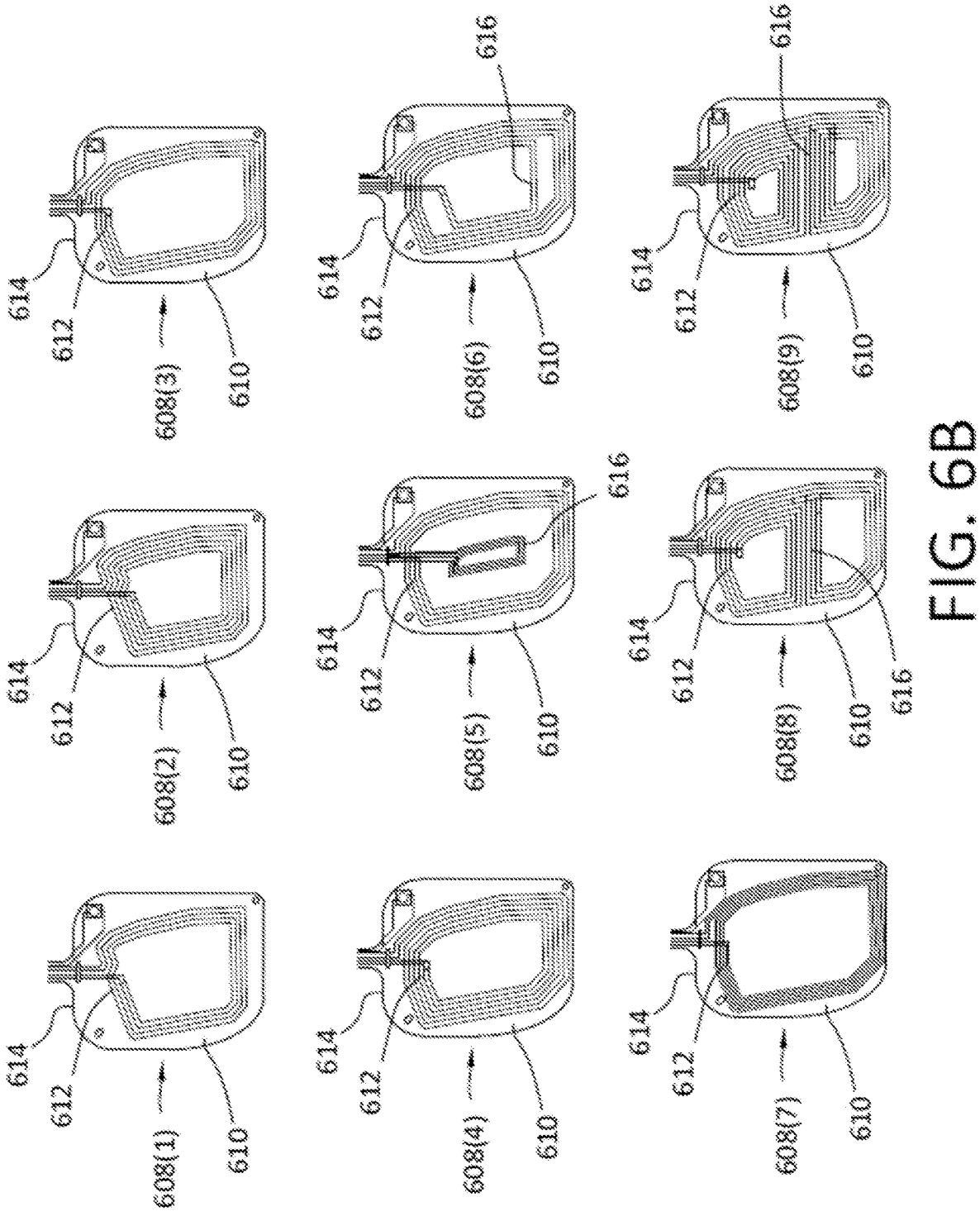
FIG. 6B depicts several implementations of charging antennas within the present disclosure.

FIG. 6B depicts several implementations of charging antennas within the present disclosure. A charging antenna may include an antenna pattern 608 in which the antenna substrate 610 includes charging coils 612 that are arranged with a selected spacing, position, number of turns, and so forth.

For example, a first antenna pattern 608(1) is depicted that includes two turns of a charging coil 612 arranged in a four-sided shape that extends proximate to the antenna perimeter 614 of the antenna substrate 610.

A second antenna pattern 608(2) is shown that includes three turns of a charging coil 612 arranged in a four-sided shape. Use of three turns of a charging coil 612 may provide the portions of the antenna substrate 610 that include charging coils 612 with a greater width than those shown in the first antenna pattern 608(1). As a result, a larger portion of a central region of the antenna substrate 610 includes charging coils 612, and the charging coils 612 extend closer to the antenna perimeter 614 than those shown for the first antenna pattern 608(1).

A third antenna pattern 608(3) is shown that includes two turns of a charging coil 612, arranged in an elongated four-sided shape. The elongated four-sided shape positions the charging coils 612 closer to the antenna perimeter 614 of the antenna substrate 610 than the charging coils 612 shown in the first antenna pattern 608(1) or second antenna pattern 608(2), which may increase the range of positions for a receiving antenna that may receive electrical power from the charging antenna. For example, the outermost portion of the charging coils 612 may be positioned between 3.8 and 2.8 mm from the upper and lower edges of the antenna perimeter 614, respectively.

A fourth antenna pattern 608(4) is shown that includes three turns of a charging coil 612, arranged in an elongated four-sided shape. The charging coils 612 of the fourth antenna pattern 608(4) are positioned proximate to the upper and lower edges of the antenna perimeter 614, similar to the charging coils 612 in the third antenna pattern 608(3). Use of three turns of a charging coil 612 in the fourth antenna pattern 608(4) may enable the charging coils 612 to occupy a larger portion of the center of the antenna substrate 610 than the charging coils 612 of the third antenna pattern 608(3).

A fifth antenna pattern 608(5) is shown that includes two turns of a charging coil 612 arranged in an elongated four-sided shape that includes an additional inner coil pattern 616 positioned at the approximate center of the antenna substrate 610. Therefore, while the charging coils 612 of the elongated four-sided shape are positioned proximate to the antenna perimeter 614, the inner coil pattern 616 positions additional charging coils 612 within a central region of the antenna substrate 610 to increase the range of positions and the efficiency by which a receiving antenna may receive electrical power from the charging antenna.

A sixth antenna pattern 608(6) is shown that includes three turns of a charging coil 612 arranged in an elongated four-sided shape that includes lengths of charging coil 612 that extend across a central portion of the antenna substrate 610 to increase the range of positions and the efficiency by which a receiving antenna may receive electrical power from the charging antenna relative to the arrangement of charging coils 612 shown for the third antenna pattern 608(3).

A seventh antenna pattern 608(7) is shown that includes three turns of a charging coil 612, with a narrow spacing between each turn, arranged in an elongated four-sided shape that positions the charging coils 612 with an increased concentration toward the antenna perimeter 614, relative to the other antenna patterns 608 described previously.

An eighth antenna pattern 608(8) is shown that includes two turns of a charging coil 612, arranged in an elongated four-sided shape, with lengths of charging coil 612 that extend across a central region of the antenna substrate 610. Inclusion of charging coil 612 within the central region of the antenna substrate 610 may increase the range of positions and the efficiency by which a receiving antenna may receive electrical power from the charging antenna compared to other antenna patterns 608 that lack charging coils 612 within the central region of the antenna substrate 610.

A ninth antenna pattern 608(9) is shown that includes three turns of a charging coil 612, arranged in an elongated four-side shape, with a significant length of charging coil 612 extending through the central region of the antenna substrate 610. The arrangement of charging coil 612 in the ninth antenna pattern 608(9) covers the majority of the antenna substrate 610 with charging coil 612, which may increase the range of positions and the efficiency by which a receiving antenna may receive electrical power from the charging antenna.

FIGS. 7A-7D are a series of diagrams 700 depicting implementations of bridge supports 108 that may be used to support a nose bridge 208 of a front frame 204 of a head-mounted wearable device (HMWD) 202.

Figure 7B:
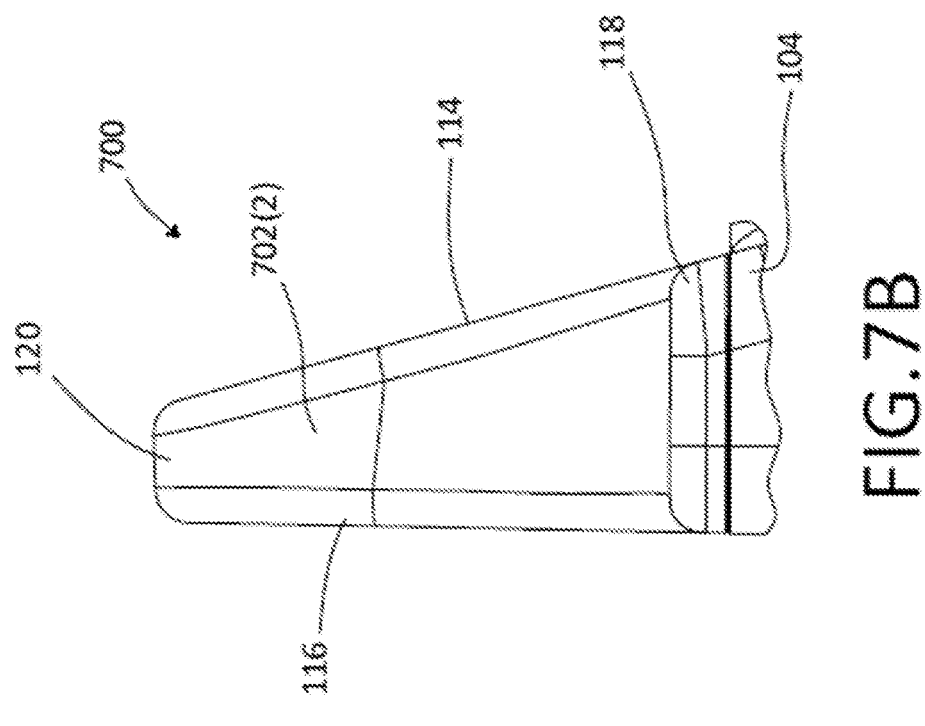
FIGS. 7A-7D depict various implementations of bridge supports that may be used to support a nose bridge of a front frame of a head-mounted wearable device (HMWD).
Figure 7A:
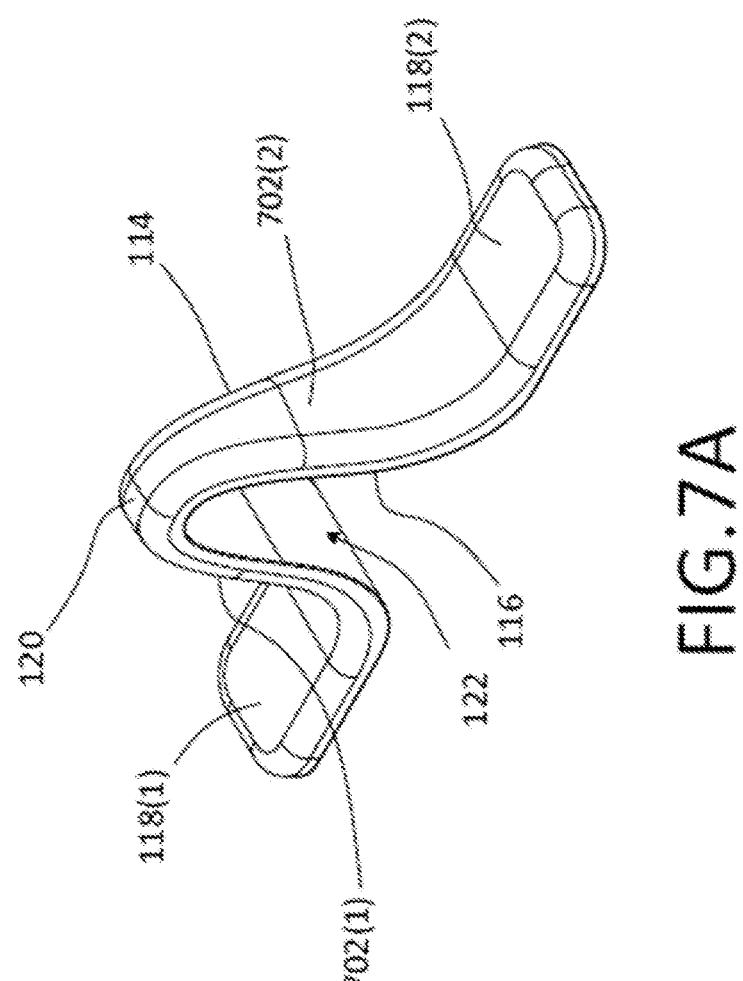

FIG. 7A depicts a perspective view of the bridge support 108 shown in FIGS. 1-5. FIG. 7B depicts a side view of the bridge support 108 of FIG. 7A. The bridge support 108 may have a curved shape, defined by a first curved surface 702(1), which extends between a first bottom portion 118(1) of the bridge support 108 to a top portion 120 that supports a HMWD 202, and a second curved surface 702(2) that extends between the top portion 120 and a second bottom portion 118(2). The curved shape of the bridge support 108 may provide the bridge support 108 with a top portion having a convex surface that faces away from the base 104 and a concave surface that faces the base 104. The bottom portions 118 of the bridge support 108 may engage the base 104 at one or more attachment points 330, as shown in FIG. 3. The curved shape of the bridge support 108 positions the top portion 120 of the bridge support 108 at a greater distance from the base 104 than the bottom portions 118, defining a space 122 between the top portion 120 and the base 104, and between the first and second curved surfaces 702.

As shown in FIG. 7B, the bridge support 108 may have a first side 114 that extends from the base 104 at an angle. The first side 114 may face the sidewall 106, as shown in FIG. 1, and the sidewall 106 may also extend from the base 104 at an angle, which provides the space 110 between the sidewall 106 and the bridge support 108 with an angled orientation relative to the base 104. A second side 116 of the bridge support 108, that faces away from the sidewall 106, may extend generally perpendicularly from the base 104. In other implementations, the second side 116 may extend from the base 104 at the same angle as the first side 114, or at a different angle.

Figure 7C:
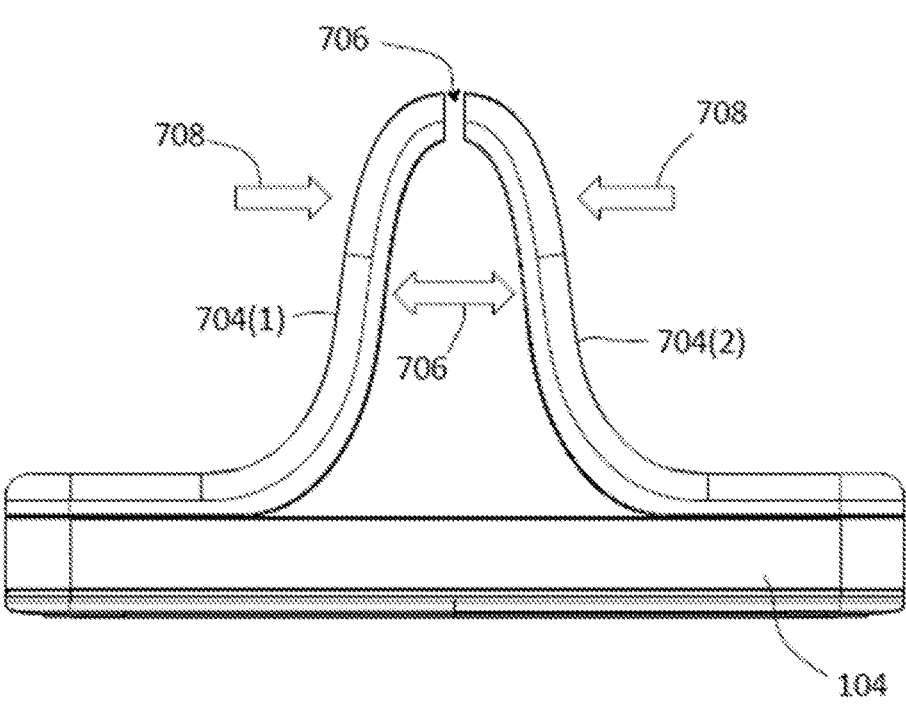

In other implementations, one or more portions of the bridge support 108 may be adjustable, or removeable and replaceable. For example, FIG. 7C depicts an implementation of a bridge support 108 having a first movable surface 704(1) extending from the base 104, that is positioned adjacent to a second movable surface 704(2) that also extends from the base 104. The movable surfaces 704 are shown having a curved shape similar to that of the bridge support 108 shown in FIGS. 7A and 7B. In the implementation shown in FIG. 7C, the first movable surface 704(1) and the second movable surface 704(2) may be formed from a deformable or movable material, such as rubber, one or more polymers or elastomers, metal, a leaf spring, and so forth. The material from which the movable surfaces 704 are formed may apply a biasing force 706 to the movable surface 704. For example, the biasing force 706 may cause the first movable surface 704(1) to move away from the second movable surface 704(2) and the second movable surface 704(2) to move away from the first movable surface 704(1), such that a gap 707 exists between the movable surfaces 704. Engagement between the movable surfaces 704 and the base 104 may limit movement of the movable surfaces 704 that may be caused by the biasing force 706.

When a HMWD 202 is engaged with the bridge support 108 shown in FIG. 7C, contact between the movable surfaces 704 and the HMWD 202, or a user-applied force to one or more of the movable surfaces 704, may apply an engagement force 708 to one or more of the movable surfaces 704. The engagement force(s) 708 may counteract the biasing force 706 and move one or both of the movable surfaces 704 closer to one another (e.g., narrowing the width of the gap 707). Contact between the movable surfaces 704 may limit movement of the movable surfaces 704 relative to one another under the application of the engagement force(s) 708. The engagement force(s) 708 may reduce a width of the bridge support 108 to enable a nose bridge 208 of an HMWD 202 having a particular width to engage both of the movable surfaces 704 by reducing the width of the bridge support 108 to a width that is less than or equal to that of the nose bridge 208. When the HMWD 202 is engaged with the bridge support 108, the biasing force 706 may cause the movable surfaces 704 to be pressed against the nose bridge 208, which may frictionally retain the nose bridge 208 relative to the bridge support 108 in addition to the contact between the nose bridge 208 and the bridge support 108 constraining movement of the HMWD 202 relative to the charging device 202.

Figure 7D:
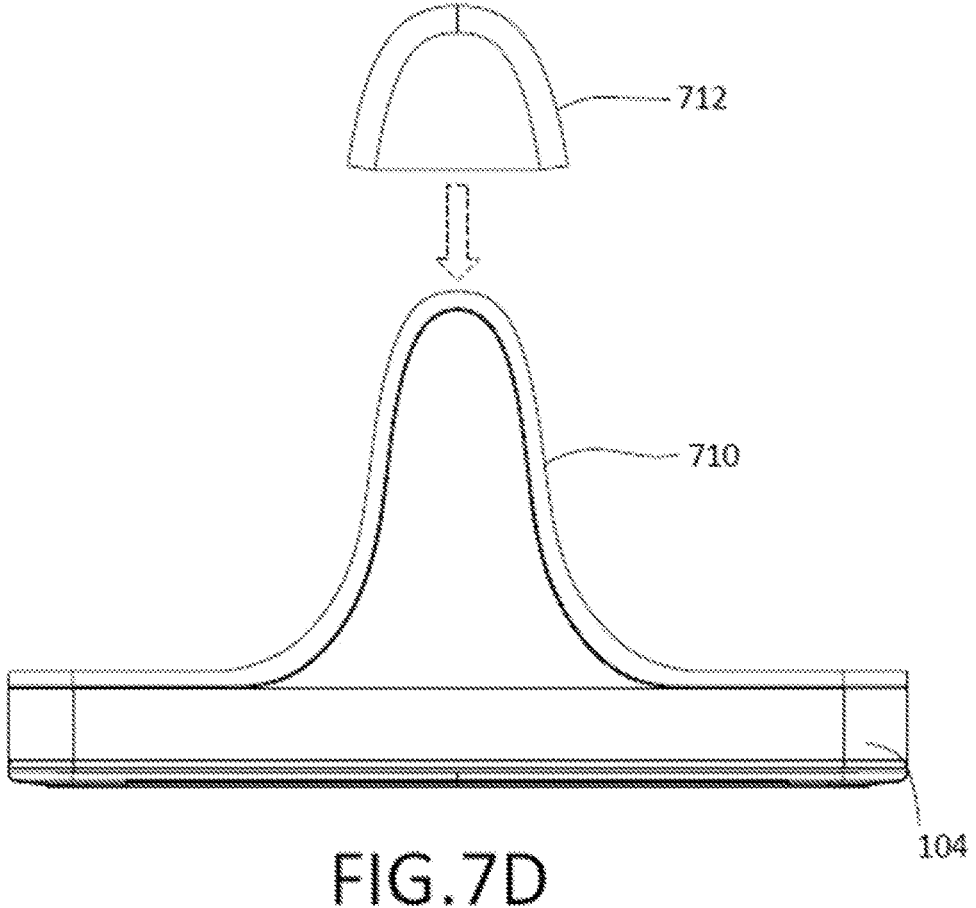

FIG. 7D depicts an implementation of a bridge support 108 having a support frame 710 over which a support cover 712 is placed. The support cover 712 may be removable and replaceable with other support covers 712 having different dimensions, external features, and so forth. In other implementations, the support cover 712 may be adjustable. For example, the support cover 712 may be formed from a material that is shapeable, while the support frame 710 is composed of a generally rigid material that retains its shape, and adjustment of the support cover 712 may include molding or otherwise modifying the shape of the support cover 712. As another example, the support cover 712 may be adjustable by securing the support cover 712 at different positions relative to the support frame 710, such as different locations along the height of the support frame 710, thereby changing the effective height of the bridge support 108. While FIG. 7D depicts an implementation in which the support cover 712 only partially covers the support frame 710, in other implementations, the support cover 712 may have a length generally equal to the height of the support frame 710.

Figure 8:
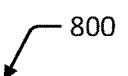
FIG. 8 is a block diagram depicting components of an implementation of a charging device within the present disclosure.

FIG. 8 is a block diagram 800 depicting components of an implementation of a charging device 102 within the present disclosure.

In some cases, one or more power supplies 802 may be configured to provide electrical power suitable for operating the components in the charging device 102. The power supply 802 may include batteries, capacitors, fuel cells, photovoltaic cells, wireless power receivers, conductive couplings suitable for attachment to an external power source such as provided by an electric utility, and so forth.

The charging device 102 may include one or more hardware processors 804 configured to execute one or more stored instructions. The processors 804 may comprise one or more cores. The processors 804 may include general purpose microprocessors, microcontrollers, application specific integrated circuits (ASICs), digital signal processors (DSPs), and so forth. One or more clocks 806 may provide information indicative of date, time, ticks, and so forth. For example, the processor 804 may use data from the clock 806 to associate a particular interaction with a particular point in time, trigger a preprogrammed action, and so forth.

The charging device 102 may include one or more communication interfaces 808 such as input/output (I/O) interfaces 810, network interfaces 812, and so forth. The communication interfaces 808 enable the charging device 102, or components thereof, to communicate with other devices or components. The I/O interfaces 810 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 810 may couple to one or more I/O devices 814. The I/O devices 814 may include one or more types of sensors 816 that may function to receive input from a user or from an environment associated with the charging device 102, and one or more types of output devices 818 that may be used to present data or a signal to a user.

The network interfaces 812 may be configured to provide communications between the charging device 102 and other devices, such as an HMWD 202, one or more servers, and so forth. The network interfaces 812 may include devices configured to couple to personal area networks (PANs), wired or wireless local area networks (LANs), wide area networks (WANs), and so forth. For example, the network interfaces 812 may include devices compatible with Ethernet, Wi-Fi, Bluetooth, Bluetooth Low Energy, ZigBee, 5G, LTE, and so forth.

The charging device 102 may also include one or more buses or other internal communications hardware or software that allow for the transfer of data between the various modules and components of the charging device 102.

As shown in FIG. 8, the charging device 102 may include one or more memories 820. The memory 820 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 820 provides storage of computer-readable instructions, data structures, program modules, and other data for the operation of the charging device 102. A few examples of functional modules are shown stored in the memory 820, although the same functionality may alternatively be implemented in hardware, firmware, or as a system on a chip (SoC).

The memory 820 may include at least one operating system (OS) module 822. The OS module 822 is configured to manage hardware resource devices such as the I/O interfaces 810, the I/O devices 814, the communication interfaces 808, and provide various services to applications or modules executing on the processors 804. The OS module 822 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; and so forth.

Also stored in the memory 820 may be a data store 824 and one or more of the following modules. These modules may be executed as foreground applications, background tasks, daemons, and so forth. The data store 824 may use a flat file, database, linked list, tree, executable code, script, or other data structure to store information. In some implementations, the data store 824 or a portion of the data store 824 may be distributed across one or more other devices including servers, network attached storage devices, and so forth.

The memory 820 may store a processing module 826, which may use sensor data 828 acquired using one or more sensors 816, and in some implementations threshold data 830, to cause the charging device 102 to perform various functions. For example, sensor data 828 may be used to determine whether an HMWD 202 is engaged with the charging device 102, which may be used to initiate and cease a charging process, transition between active and low power states, and so forth. As another example, sensor data 828 may be used to determine a temperature of one or more portions of the charging device 102 or an HMWD 202 during a charging process, and based on a relationship between the determined temperature and a threshold temperature, control the charging process, such as by reducing a rate at which electrical power is sent to the HMWD 202. The processing module 826 may also function to process input received by the I/O devices 814 and data received from other computing devices, and may determine output data 834 based on the received input or received data.

The memory 820 may also store a communication module 836. The communication module 836 may be used to exchange data, signals, commands, and so forth with other computing devices. Communications may be authenticated, encrypted, and so forth.

Other modules 838 may also be present in the memory 820 as well as other data 840 in the data store 824. For example, other modules 838 may include authorization and authentication modules used to acquire authorization from users for acquisition and processing of sensor data 828, authentication data to authenticate uses and communications, and so forth. Other modules 838 may include interface modules for presenting visible or audio user interfaces, such as to change configurations or settings associated with the charging device 102. Other data 840 may include encryption schema, various configurations and settings for the charging device 102, user interface data that may be presented to users of the charging device 102, and so forth.

Figure 9:
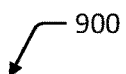
FIG. 9 is a block diagram that illustrates implementations of sensors and output devices of a charging device that may be used within the present disclosure.
Figure 9:
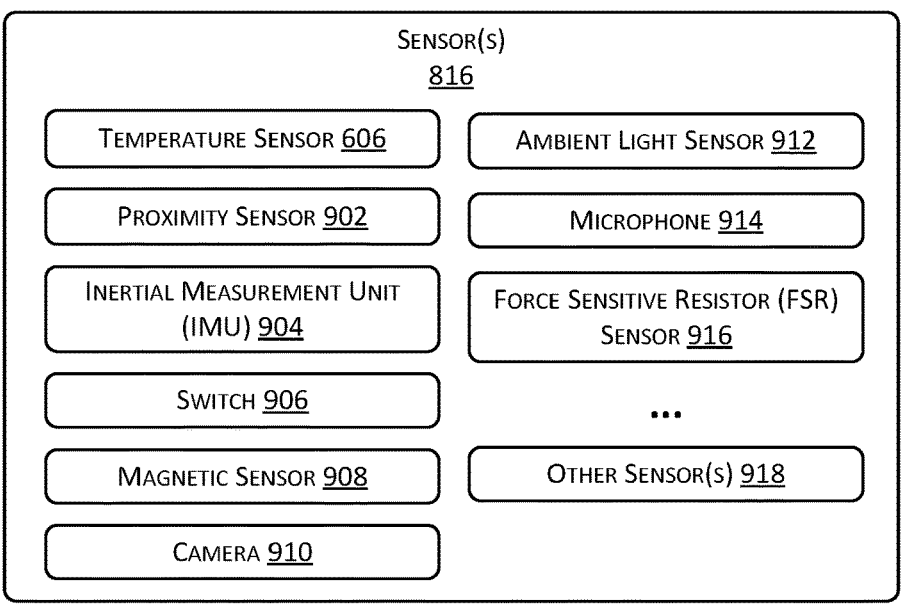
Figure 9:
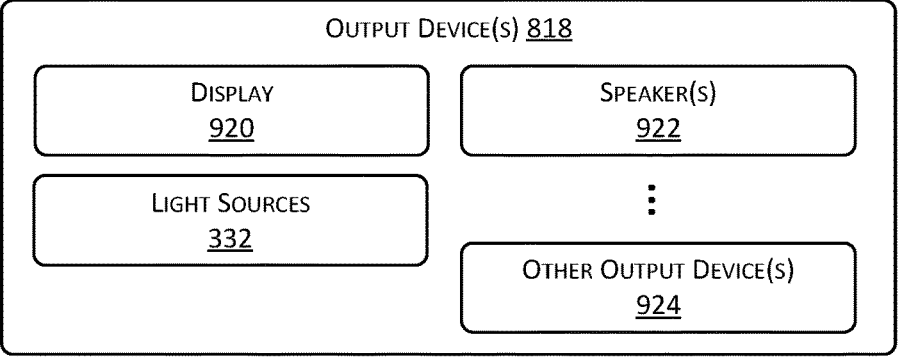

FIG. 9 is a block diagram 900 that illustrates implementations of sensors 816 and output devices 818 of a charging device 102 that may be used within the present disclosure.

As described with regard to FIG. 6A, in some implementations, the charging device 102 may include one or more temperature sensors 606. A temperature sensor 606 may provide data indicative of a temperature of one or more components of the charging device 102. For example, a temperature sensor 606 may be associated with a charging antenna, the charging circuitry 310, or one or more other portions of the charging device 102. A charging process may be controlled based on data from the temperature sensor 606. For example, based on a relationship between a determined temperature and a threshold temperature, a quantity of electrical power provided to an HMWD 202 may be changed. In some implementations, a temperature sensor 606 may determine data indicative of a temperature of an ambient environment proximate to the charging device 102. Additionally, in some implementations, the temperature sensor 606 may include an infrared temperature senor that may be used to determine the temperature of another object, such as a temperature of an HMWD 202 engaged with the charging device 102. For example, the charging process may be controlled based in part on a determined temperature of the HMWD 202 using a temperature sensor 606 associated with the charging device 102.

In some cases, the charging device 102 may include one or more proximity sensors 902. For example, proximity sensors 902 may include, without limitation, capacitive sensors, touch sensors, optical sensors, and so forth. Continuing the example, a capacitive sensor may provide as output a one dimensional set of capacitance values while a touch sensor may provide output indicative of touch points as expressed along two dimensions. Proximity sensors 902 may be used to detect engagement with an HMWD 202, receipt of user input, and so forth. For example, in response to data from a proximity sensor 902 indicative of engagement with an HMWD 202, a charging process may be initiated, a light source 332 may be actuated to indicate engagement with the HMWD 202 or initiation of the charging process, and so forth.

In some cases, the sensors 816 may include one or more Inertial Measurement Units (IMU) 904. For example, an IMU 904 may include one or more accelerometers, motion sensors, and so forth, which may detect movement, tilting, tipping over, falling or other types of motion, position, or orientation associated with the charging device 102. For example, in response to sensor data indicating an orientation corresponding to the charging device 102 having fallen or tipped over, a charging process may be discontinued. Continuing the example, an IMU 904 may include a tilt sensor that provides sensor data indicative of an orientation of the charging device 102 with respect to vertical. In other cases, an IMU 904 may include one or more gyrometers that provide data indicative of rotation of the charging device 102 to indicate a change in orientation, accelerometers that provide data indicative of movement of the charging device 102, and so forth.

The sensors 816 may include one or more switches 910. A switch 910 may include a mechanical or electronic switch, button, or other mechanism that is responsive to an external force, such as manual input. For example, a switch 910 may include a spring-biased switch that, when depressed, establishes an electric connection. Switches 910 may include mechanical switches, electronic switches, capacitive switches, and so forth.

In some implementations, the sensor(s) 816 may include a magnetic sensor 908, such as a magnetometer, magnetic reed switch, and so forth that provides information about magnetic fields. For example, a magnetometer may utilize a plurality of Hall effect sensors to detect the presence of the terrestrial magnetic field, magnetic field from a magnet, and so forth. In some cases, the magnetic sensor 814 may be used to determine the presence of absence of objects, which may be used to detect engagement with an HMWD 202, such as if the HMWD 202 is positioned on the bridge support 108 or within the space 110 of the charging device 102.

The sensor(s) 816 may include one or more cameras 910. A camera 910 may be used to acquire image data. The camera 910 may also be configured to detect light in one or more wavelengths including, but not limited to, terahertz, infrared, visible, ultraviolet, and so forth. The camera 910 may comprise one or more charge coupled devices (CCD), complementary metal oxide semiconductor (CMOS) devices, microbolometers, and so forth. The charging deice 102 may use image data acquired by a camera 910 for object recognition, such as detection of an HMWD 202 engaged with the charging device 102, user communication, and so forth.

The sensor(s) 816 may include an ambient light sensor 912, which may include one or more of a photodetector, semiconductor junction, or other device that is sensitive to the presence or absence of light. The ambient light sensor 912 may provide information indicative of the level of illumination present at the charging device 102. For example, data from an ambient light sensor 912 may be used to control a quantity of light emitted by one or more light sources 332 associated with the charging device 102. Ambient light sensors 912 may determine one or more of color, intensity, or duration of ambient lighting in an environment associated with the charging device 102.

The sensor(s) 816 may include one or more microphones 914. Microphones 914 may function to receive audio input from a user of the charging device 102, detect ambient noise associated with the charging device 102, and so forth, which may be used to control various functions of the charging device 102.

The sensors 816 may include a force sensitive resistor (or force sensing resistor) (FSR) sensor 916, which may include a material that changes in electrical resistance or conductivity responsive to an applied mechanical force. For example, an increase in force may result in a decrease in the electrical resistance measured across the material. In one implementation, the FSR sensor 916 may comprise a conductive polymer within which electrically conductive and nonconductive particles are suspended. The material to change electrical resistance may be arranged between a first electrode and a second electrode. Electrical circuitry may be used to determine electrical resistance between the first electrode and the second electrode. Data from an FSR sensor 916 may be used to operate the charging device 102.

Other sensors 918 may also be present.

In some cases, output devices 818 associated with the charging device 102 may include one or more displays 920. A display 920 may present images to a user of the charging device 102. For example, a display 920 may include a liquid crystal display or light emitting diode display that manipulates rows and columns of picture elements to form an image. The display 920 may be emissive, reflective, or both. In some implementations, the display 920 may include image projectors. For example, an image projector may be configured to project an image onto a surface or object.

The output devices 818 may include one or more light sources 332, or other types of visual indicators, that output visual indicia to convey information regarding the charging device 102.

The output devices 818 may additionally include one or more speakers 922, which may present audio output that may be audible to individuals in an environment with the charging device 102.

Other output devices 924 may also be used by the charging device 102. For example, the charging device 102 may include a dispenser to release particular scents near the nose of a user, one or more haptic output devices, and so forth.

Those having ordinary skill in the art will readily recognize that the techniques described above can be utilized in a variety of devices, environments, and situations. Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A charging device comprising:
circuitry for receiving electrical power from a source of electrical power;
a base;
a sidewall extending from the base;
a bridge support extending from the base, wherein the bridge support is spaced from the sidewall to provide a first space between the sidewall and the bridge support, wherein the first space between the sidewall and the bridge support accepts, within the first space, a second device comprising a power source; and
at least one charging antenna within the sidewall, wherein the at least one charging antenna is electrically coupled to the circuitry to receive electrical power from the circuitry, and wherein the at least one charging antenna is configured to provide electrical power to the power source of the second device that is positioned in the first space between the sidewall and the bridge support.

2. The charging device of claim 1, wherein:
the sidewall extends from the base at a non-perpendicular angle relative to the base; and
the bridge support has a first side and a second side, the first side is closer to the sidewall than the second side, and the first side extends vertically from the base at the non-perpendicular angle relative to the base and is parallel to the sidewall.

3. The charging device of claim 1, further comprising:
an elastomeric coating on one or more of the sidewall or the bridge support to provide friction between the charging device and the second device positioned in the first space between the sidewall and the bridge support to constrain movement of the second device relative to the charging device.

4. A charging device comprising:
a base;
a sidewall extending from the base;
a bridge support extending from the base, wherein the bridge support is spaced from the sidewall to provide a first space between the sidewall and the bridge support; and
at least one charging antenna within the sidewall, wherein the at least one charging antenna is electrically coupled to a source of electrical power to provide electrical power to a receiving antenna of a second device that is positioned in the first space between the sidewall and the bridge support.

5. The charging device of claim 4, wherein:
a first side of the sidewall extends from the base at a non-perpendicular angle relative to the base; and
a second side of the bridge support extends from the base at the non-perpendicular angle relative to the base.

6. The charging device of claim 4, wherein the bridge support includes a bottom portion that is connected to the base and a top portion that is spaced from the base to define a second space between the top portion and the base.

7. The charging device of claim 6, further comprising a light source positioned on a portion of the base proximate to the second space, wherein the bridge support at least partially occludes light emitted from the light source.

8. The charging device of claim 4, further comprising one or more weights coupled to the base.

9. The charging device of claim 4, further comprising:
a temperature sensor proximate to one or more of the at least one charging antenna or the second device within the first space; and
circuitry to, responsive to output from the temperature sensor, control transmission of electrical power using the at least one charging antenna.

10. The charging device of claim 4, wherein a top portion of the bridge support has a curved shape with a convex side and a concave side, wherein the concave side faces the base.

11. The charging device of claim 4, wherein the bridge support comprises a first curved surface and a second curved surface, and wherein at least one of the first curved surface or the second curved surface is movable relative to the other of the first curved surface or the second curved surface to change a width of the bridge support.

12. The charging device of claim 11, wherein the at least one of the first curved surface or the second curved surface is formed from a material that applies a biasing force away from the other of the first curved surface or the second curved surface.

13. The charging device of claim 4, wherein the bridge support comprises a support frame and a support cover positioned over the support frame, and wherein the support cover is removable from the support frame to change one or more dimensions of the bridge support.

14. The charging device of claim 4, wherein the bridge support comprises a support frame and a support cover positioned over the support frame, and wherein the support cover is formed from a shapeable material that is deformable to change one or more dimensions of the bridge support.

15. The charging device of claim 4, wherein the bridge support comprises a support frame and a support cover positioned over the support frame, and wherein the support cover is engageable to at least a first position on the support frame that is a first distance from the base, and a second position on the support frame that is a second distance from the base.

16. The charging device of claim 4, wherein the at least one charging antenna comprises a first charging antenna positioned within the sidewall proximate to a first lateral side of the sidewall and a second charging antenna positioned within the sidewall proximate to a second lateral side of the sidewall.

17. A system comprising:
a charging device comprising:
a base;
a sidewall extending from the base;
a bridge support extending from the base, wherein the bridge support is spaced from the sidewall to provide a first space between the sidewall and the bridge support; and
at least one charging antenna within the sidewall, wherein the at least one charging antenna is electrically coupled to a source of electrical power to provide electrical power to a receiving antenna positioned in the first space; and

24 a wearable device comprising:
a front frame that includes a nose bridge, wherein at least a portion of the nose bridge is constrained from vertical movement toward the base by the bridge support;
a first temple connected to the front frame, wherein at least a portion of the first temple is positioned within the first space and is constrained from movement away from the at least one charging antenna by the bridge support;
a second temple connected to the front frame, wherein at least a portion of the second temple is positioned within the first space and is constrained from movement away from the at least one charging antenna by the bridge support;
a first receiving antenna within the first temple, wherein the first receiving antenna is positioned relative to the at least one charging antenna to receive electrical power from the at least one charging antenna, and wherein the base constrains movement of the first temple away from the front frame to retain the first receiving antenna within one or more first positions relative to the at least one charging antenna; and
a second receiving antenna within the second temple, wherein the second receiving antenna is positioned relative to the at least one charging antenna to receive electrical power from the at least one charging antenna, and wherein the base constrains movement of the second temple away from the front frame to retain the second receiving antenna within one or more second positions relative to the at least one charging antenna.

18. The system of claim 17, further comprising:
one or more temperature sensors proximate to one or more of the charging device or the wearable device; and
circuitry to, in response to output from the one or more temperature sensors, change a quantity of electrical power provided from the charging device to one or more of the first receiving antenna or the second receiving antenna.

19. The system of claim 17, wherein the sidewall extends from the base at a non-perpendicular angle relative to the base, the bridge support extends from the base at the non-perpendicular angle relative to the base, and the first space extends between the sidewall and the bridge support at the non-perpendicular angle relative to the base.

20. The system of claim 17, further comprising:
a sensor associated with the charging device and oriented to detect one or more of the first temple or the second temple within the first space; and
circuitry to, in response to output from the sensor, provide the electrical power from the at least one charging antenna to the first receiving antenna and the second receiving antenna.

* * * * *